UNITED STATES PATENT OFFICE.

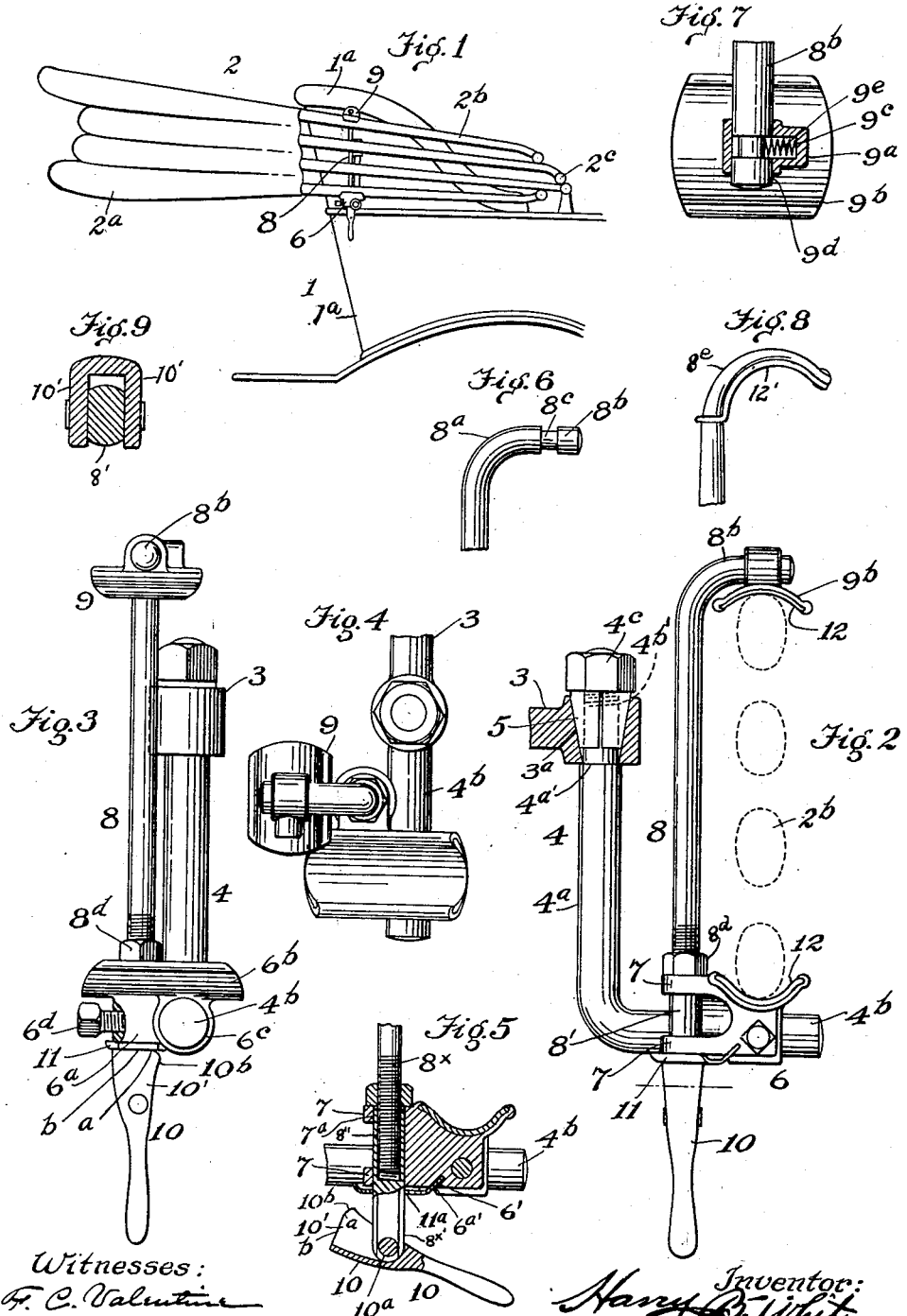

HARRY B. WHITE, OF CANTON, OHIO, ASSIGNOR TO THE GILLIAM MANUFACTURING COMPANY, OF CANTON, OHIO, A CORPORATION OF OHIO.

BOW REST AND CLAMPING DEVICE.

1,218,966.   Specification of Letters Patent.   Patented Mar. 13, 1917.

Application filed December 16, 1913. Serial No. 807,049.

*To all whom it may concern:*

Be it known that I, HARRY B. WHITE, a citizen of the United States, residing at Canton, in the county of Stark and State of Ohio, have invented certain new and useful Improvements in and Relating to Bow Rest and Clamping Devices, of which the following is a specification.

This invention relates to devices for supporting and clamping the bows of a vehicle top in a folded condition when it is collapsed.

For the purpose of illustration, I have in the accompanying drawings, shown and herein described one form of supporting and clamping device embodying my invention.

In the drawings, Figure 1 is a side elevation of a vehicle, the top therefor being collapsed, and having a bow rest and clamping device, embodying my invention, supporting the bows of the top in their folded or collapsed position.

Fig. 2 is a side elevation of the bow supporting and clamping device, the bows of the top being shown in section, and clamped between the upper and lower bow engaging members of said device.

Fig. 3 is a front view of the support and clamping device.

Fig. 4 is a top plan view of the supporting and clamping device in inoperative position.

Fig. 5 is a sectional view.

Fig. 6 is a fragmentary view of parts of the device detached from each other.

In the drawings, 1 indicates a vehicle having a body $1^a$. The vehicle may be of any standard or preferred form of construction and may be propelled in any suitable manner. 2 indicates a top for the vehicle comprising a cover $2^a$ formed of suitable material such as fabric, and a series of bows $2^b$ which support the cover $2^a$. The bows $2^b$ are pivotally supported on the vehicle and relative to each other, in any suitable manner, as shown at $2^c$, whereby the top may be raised to cover the vehicle, or folded backwardly and downwardly, as shown in Fig. 1 of the drawings.

3 indicates brackets fixed to and extending laterally from either side of the body $1^a$, at or near its rear end, only one of said brackets being shown. At its outer end the bracket 3 is preferably formed with an opening $3^a$, which may be of conical shape, to receive the upper end of a supporting member 4. The supporting member 4 preferably comprises a depending rod $4^a$, the lower end of which is curved or bent laterally, to form a supporting arm $4^b$. The upper end of the rod $4^a$ is preferably reduced and fits within and extends through the opening $3^a$. At $4^{b'}$ the reduced end of the rod is provided with screw threads to receive a nut $4^c$. As will be readily understood, the operation of screwing the nut $4^c$ downwardly will draw the supporting member upwardly, and thus result in clamping the shoulder $4^{a'}$, formed by the reduced end of the rod $4^a$, against the under side of the bracket 3. 5 indicates a slotted sleeve member, the outer walls of which are of conical shape to fit within and engage the inner walls of the opening $3^a$. This member 5 surrounds the reduced end of the rod $4^a$ and is interposed between the nut $4^c$ and shoulder $4^{a'}$. When the nut is tightened it engages with the sleeve member 5 and forces it downwardly. The effect of this operation is to cause the sleeve member to contract into snug engagement with the rod $4^a$ and thus rigidly bind or secure it within the opening $3^a$ of and to the bracket 3.

6 indicates a rest member comprising a body portion $6^a$ and a plate $6^b$ which is adapted to be engaged by and form the rest for the lowermost bow $2^b$ of the top 2. As shown in the drawings, the plate $6^b$ is preferably arc shaped in cross section to form a suitable bow seat, the walls of which prevent movement of the lowermost bow in lateral direction, thus coöperating with the bow pivot connections to maintain the bows in alinement with each other and to overcome strains upon the pivots thereof. As shown at $6^c$, the body portion $6^a$ of the rest member is slightly enlarged and formed with an opening extending transversely to the plate $6^b$, to receive the arm $4^b$ of the depending supporting member 4. The arm $4^b$ and the opening $6^c$ in the body portion $6^a$ are round to permit angular adjustment of the rest member 6 on said arm $4^b$ when that is found desirable. $6^d$ indicates a set screw or bolt fitting a screw threaded opening formed in and extending through the body portion $6^a$ of the rest member. The inner end of this opening merges into the opening $6^c$, whereby the free end of the screw or bolt $6^d$ will engage with and detachably secure the rest member 6 to the laterally extending arm 4ᵇ. In the preferred form of construction, the body portion 6ᵃ and bow engaging plate 6ᵈ are formed integrally.

7 indicates one or more arms extending rearwardly from the rest member 6, each formed with an opening 7ᵃ and adapted to support the supporting and clamping means, indicated at 8 as an entirety, for a bow engaging member 9 which engages the uppermost bow 2ᵇ and coöperates with the rest member 6 to clamp the bows in folded condition.

These means 8 comprise a support 8' carried by the arm or arms 7 and a device 10 pivoted to swing relative to the rest member 6, whereby the clamp 9 may be operated to clamp or unclamp the bows 2ᵇ. In the preferred form of construction, the lever 10 is arranged below the arm 7 and may be pivoted to the support 8', whereby in coöperation with the arm 7 as a fixed abutment it will effect operation of the clamp member 9. The support 8' preferably comprises a rod, which rotatably and slidably fits the opening 7ᵃ formed in the arm 7. At its upper end the rod 8' is preferably bent or curved laterally as shown at 8ᵃ to provide a bracket 8ᵇ, which carries the bow engaging member 9. The bow engaging member 9 preferably comprises a body portion 9ᵃ and an inverted arc shaped plate 9ᵇ formed integrally therewith.

Any suitable means may be provided for securing the bow engaging member 9 to the arm or bracket to prevent movement thereon. Of the means herein shown, 8ᶜ indicates an annular groove formed in the bracket 8ᵇ. 9ᶜ indicates a recess or socket formed in the body portion 9ᵃ and extending radially of the axis of the opening 9ᵈ in said body portion to receive the bracket 8ᵇ. The open end of the socket 9ᶜ merges into the opening 9ᵈ. 9ᵉ indicates a coiled spring mounted in the socket 9ᶜ and bearing at opposite ends against the end wall thereof and the surface of the bracket 8ᵇ forming the bottom of the annular groove 8ᶜ. The coiled spring 9ᵉ being under tension, yieldingly presses against the bottom surface of the annular groove 8ᶜ and adjustably secures the bow engaging member 9 to the bracket 8ᵇ; that is, it retards any force tending to rotate the member on the bracket, but permits it to be angularly adjusted thereon, whereby it may readily adapt itself to the inclination of the uppermost bow 2ᵇ when moved into engagement therewith. As the outer end of the coiled spring 9ᵉ is arranged between the side walls of the annular groove 8ᶜ, it will be seen that it coöperates therewith to prevent movement of the bow engaging member 9 longitudinally of the bracket 8ᵇ or in a lateral direction relative to the vehicle body 1ᵃ. The spring 9ᵉ also operates to prevent vibration of the clamp member 9 on the bracket 8ᵇ. 8ᵈ indicates an abutment or stop carried by the rod 8 and adapted to engage the adjacent arm 7 when the bows 2ᵇ are clamped as will be hereinafter described.

The device 10 operates to move the rod 8' downwardly into clamping position, whereby the bow engaging member 9 coöperates with the rest member 6 to support and clamp the bows of the vehicle top 2 between them in folded condition. This device preferably comprises a lever pivoted to the lower end of the rod 8' and a cam 10ᵇ carried thereby and arranged to engage the rest 6 or arm 7 to effect the clamping operation. The cam is preferably formed by rounding one corner of the lever 10 at its upper end. The lower end of the lever serves as an operating handle. The upper portion of the lever 10 is preferably U-shaped, the legs 10', 10' of which are disposed upon opposite sides of the rod 8', and each of the legs 10' may be provided with a cam 10ᵇ. The bottom of the U portion is arranged to engage the rod 8' when the lever is operated to move the rod downwardly, as will be later described, thus serving as a stop to limit the movement of the lever in one direction. The pivot 10ᵃ for the lever 10 preferably extends through both legs 10' and the lower end of the rod 8'. As a result of this construction, the operation of the lever will engage the rest member 6 or arm 7 upon opposite sides of the rod 8' and effect movement of the rod downwardly in a direction coincident with its axis. The lower end of the rod 8' is preferably flattened upon its opposite sides to form relatively wide bearing surfaces for the legs 10' of the lever.

11 indicates a yieldable device interposed between the arm 7 and the supporting and clamping means 8. Preferably the device 11 is disposed below and normally arranged a slight distance from the adjacent arm 7, whereby it will be engaged and placed under tension by the cams 10ᵇ when the lever 10 is operated to clamp the bows 2ᵇ. The yieldable device 11 may comprise a spring steel plate formed with an opening 11ᵃ through which the rod 8' extends so as to form an annular bearing surface therearound, which may be engaged by the cams 10ᵇ in any position to which the rod 8' may be moved, angularly, relative to the rest member 6. The spring plate 11 may be secured to the rest member 6 in any suitable manner. Preferably the rest member is formed with a slot 6' which receives one end of the plate 11, the metal of the rest member 6 being displaced, as shown at 6ᵃ' to secure the plate in the slot 6'. The annular portion of the plate 11, which surrounds the rod 8', is preferably somewhat wider than the walls of the opening 7ᵃ in the adjacent arm 7, in order to provide a wide hard bearing surface to be engaged by the cams 10ᵇ.

The plate 11 being formed of spring metal and placed under tension when the lever 10 is operated to clamp the bows 2$^b$, serves to prevent rattling of the parts, constituting the device, against each other due to the running of the vehicle. The provision of the bearing plate 11 also lends itself to economy and simplicity in construction of the rest member 6, since it avoids the use of an enlarged arm 7 having wide bearing surfaces which would make casting and the removal of the castings from the molds difficult.

Since the rod 8' is rotatable, as well as slidable, relative to the rest member 6, it will be understood that the bow clamp 9 can be moved to an inoperative position (see Fig. 4), or out of the path of movement of the bows 2$^b$, during opening or closing thereof, after which the cam device or lever 10 can be operated to lock the rod in such position. Thus the construction permits the bow clamp 9 to be maintained in an inoperative position during the use of the top 2 as a cover for the vehicle 1.

The rod 8' is preferably extensible in order that the bow engaging members 6 and 9 may be adjusted relative to each other to permit the proper clamping of the bows 2$^b$ and to adapt the invention to vehicles having collapsible tops, the upper and lower bows of which may be spaced from each other different distances. For this purpose the rod 8' comprises upper and lower members 8$^x$, 8$^{x'}$, the lower one 8$^{x'}$ being formed with a longitudinal screw-threaded opening 8'' extending inwardly from its upper end and adapted to receive the lower screw-threaded end of the upper member 8. As will be readily understood from this construction, the rotation of the member 8$^x$ in one direction or the other, will cause it to enter into the opening 8'' a greater or less distance and thus adjust the clamp 9 relative to the member 6. When the rod 8' is constructed in the manner just described, the stop 8$^d$ preferably comprises a nut, mounted on the upper member 8$^x$, and adapted to lock the members 8$^x$, 8$^{x'}$ in adjusted position.

It will be understood from the foregoing description, that the distance between the pivot 10$^a$ of the lever 10 and the point $a$ on the cam is greater than the distance between said pivot and the point $b$ on the cam, so that any tendency of the cam to swing in a direction to unlock the bows is opposed by the combined spring action of the plate 11 and bows 2$^b$.

It will therefore be apparent that the lever cannot become accidentally unlocked due to vibrations or strains imparted to it by the operation of the vehicle.

In the operation of the device, the top 2 is folded down or collapsed in the usual manner, the lowermost bow 2$^b$ engaging with and resting upon the bow rest 6. The adjustable member 8$^x$ is then adjusted up or down on the member 8$^{x'}$ so as to bring the clamp 9 approximately into engagement with the uppermost bow 2$^b$, whereupon the adjustable member 8$^x$ is secured to the member 8$^{x'}$ by the stop nut 8$^d$. The bow clamp 9 is then swung into a position immediately above the uppermost bow 2$^b$. Following this operation, the cam lever 10 is swung about its pivot 10$^a$, the cam 10$^b$ thereof engaging the spring plate 11, draws the rod 8' and the clamp 9, carried thereby, downwardly, and causes the latter to engage and clamp the uppermost bow 2$^b$.

In unclamping the bows 2$^b$, the lever 10 is operated in a reverse direction. Such operation releases the clamp plate 9, whereupon it can be rotated to the inoperative position and there secured, as already described.

As shown in the drawings, the plate 6$^b$ and 9$^b$ of the members 6, 9, respectively, may be provided with pads 12, suitably fixed thereto to prevent injury to the bows 2$^b$.

In Fig. 8, wherein a modified form of construction is shown, the upper end of the rod 8' is curved, as shown at 8$^e$ and preferably flattened in order to form the clamp member which engages with the uppermost bow 2$^b$. When the rod 8' is constructed in this manner, it is provided with a pad 12', one end of which is formed with an opening to receive the pad and its opposite end is riveted or otherwise fixed to the free end of clamp member 8$^e$.

This form of construction is advantageous since it is economical and simple in construction, and also slightly reduces the weight of the device.

To those skilled in the art of making apparatus of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In a device of the character described, the combination of a rest for the lowermost bow of a vehicle top adapted to be supported at the side of the vehicle, a rod supported by said rest and provided with a clamp member arranged to engage the uppermost bow, and a lever interposed between said rod and said rest, swingable relative to the latter for operating the said rod, and a spring located around said rod arranged to be compressed by the operation of the lever, and means permitting vertical adjustment of said rod.

2. In a device of the character described, the combination of a rest for the lowermost bow of a vehicle top adapted to be supported at the side of the vehicle, a rod supported by said rest and provided with a clamp member arranged to engage the uppermost bow, and a lever interposed between said rod and said rest, and a spring interposed between said lever and said rest arranged to be compressed by the operation of the lever.

3. In a device of the character described, the combination of a rest member, having a supporting arm, a rod slidably and rotatably mounted in said arm, a bow engaging member carried by said rod, a lever pivoted to the lower end of the rod, and a cam carried by the lever and arranged to engage the arm, when said lever is operated, and a spring interposed between said lever and said rest member arranged to be compressed by the operation of said lever, whereby the bow engaging member is clamped in operative position.

4. In a device of the character described, the combination of a rest member, having a supporting arm, a rod slidably and rotatably mounted in said arm, a bow engaging member carried by said rod, a lever pivoted to the lower end of the rod, a cam carried by the lever and a spring bearing plate interposed between said cam and said arm and arranged to be engaged by the cam when the lever is operated to clamp the bow engaging member in operative position.

5. In a device of the character described, the combination of a rest having a supporting arm, a rod slidably mounted in said arm, a bow clamp carried by said rod, a lever pivoted to said rod and having a U-shaped upper portion, a yieldable device provided between said arm and said lever, the legs of the U being provided with cams arranged to engage the yieldable device when the lever is operated to cause the operation of the bow clamp.

6. In a device of the character described, the combination of a rest having a supporting arm, a rod slidably mounted in said arm, a bow clamp carried by said rod, a lever pivoted to said rod and having a U-shaped upper portion, a yieldable device interposed between said rest and said lever, the legs of the U being provided with cams arranged to engage the yieldable device when the lever is operated to cause the operation of the bow clamp, and the bottom of the U-shaped portion being arranged to engage the rod to limit the movement of the lever in one direction.

7. In a device of the character described, the combination of a rest for the lowermost bow of the vehicle top adapted to be supported at the side of the vehicle, a rod supported by said rest and provided with a clamp member arranged to engage the uppermost bow, a lever interposed between said rod and said rest swingable relative to the latter for operating the said rod, a spring interposed between said lever and said rest arranged to be compressed by the operation of the lever and means permitting vertical adjustment of said rod.

8. In a device of the character described, the combination of a rest member having a bow engaging plate and a supporting arm, clamp means comprising a support adjustably supported by said arm, a bow engaging member carried by said support and movable relative to the rest member to clamp and unclamp the bows of a vehicle top, a lever pivoted on said support for controlling the operation of said bow engaging member and a yieldable device interposed between said lever and said rest member arranged to be compressed by the operation of the lever.

In testimony whereof I affix my signature in the presence of two witnesses.

HARRY B. WHITE.

Witnesses:
I. W. SHARP,
GEO. B. PITTS.

Copies of this patent may be obtained for five cents each, by addressing the "Commissioner of Patents, Washington, D. C."